Figure 1:
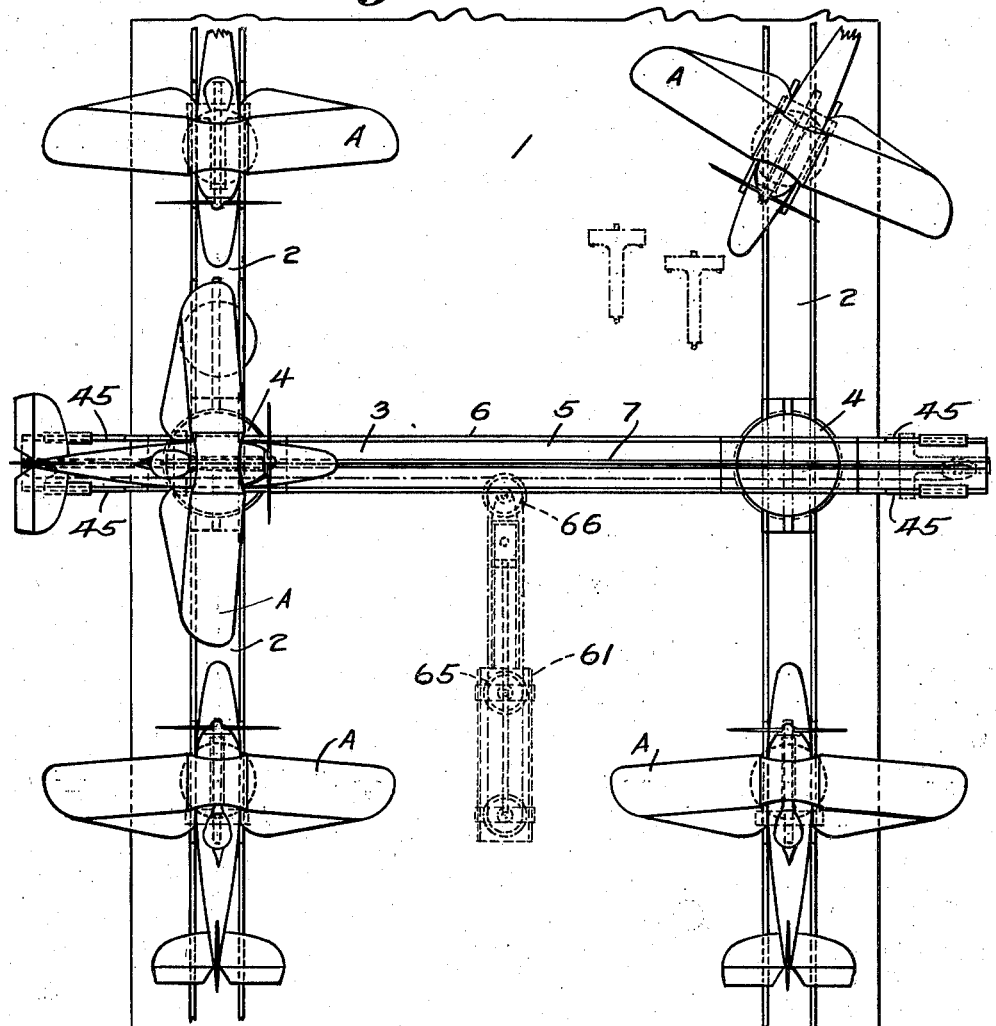

Aug. 9, 1938.  W. M. FELLERS ET AL  2,125,904
CATAPULT
Filed May 31, 1923   6 Sheets-Sheet 1

INVENTORS
WILLIAM M. FELLERS and
FREDERICK B. GROSS
BY Harold Todd
ATTORNEY

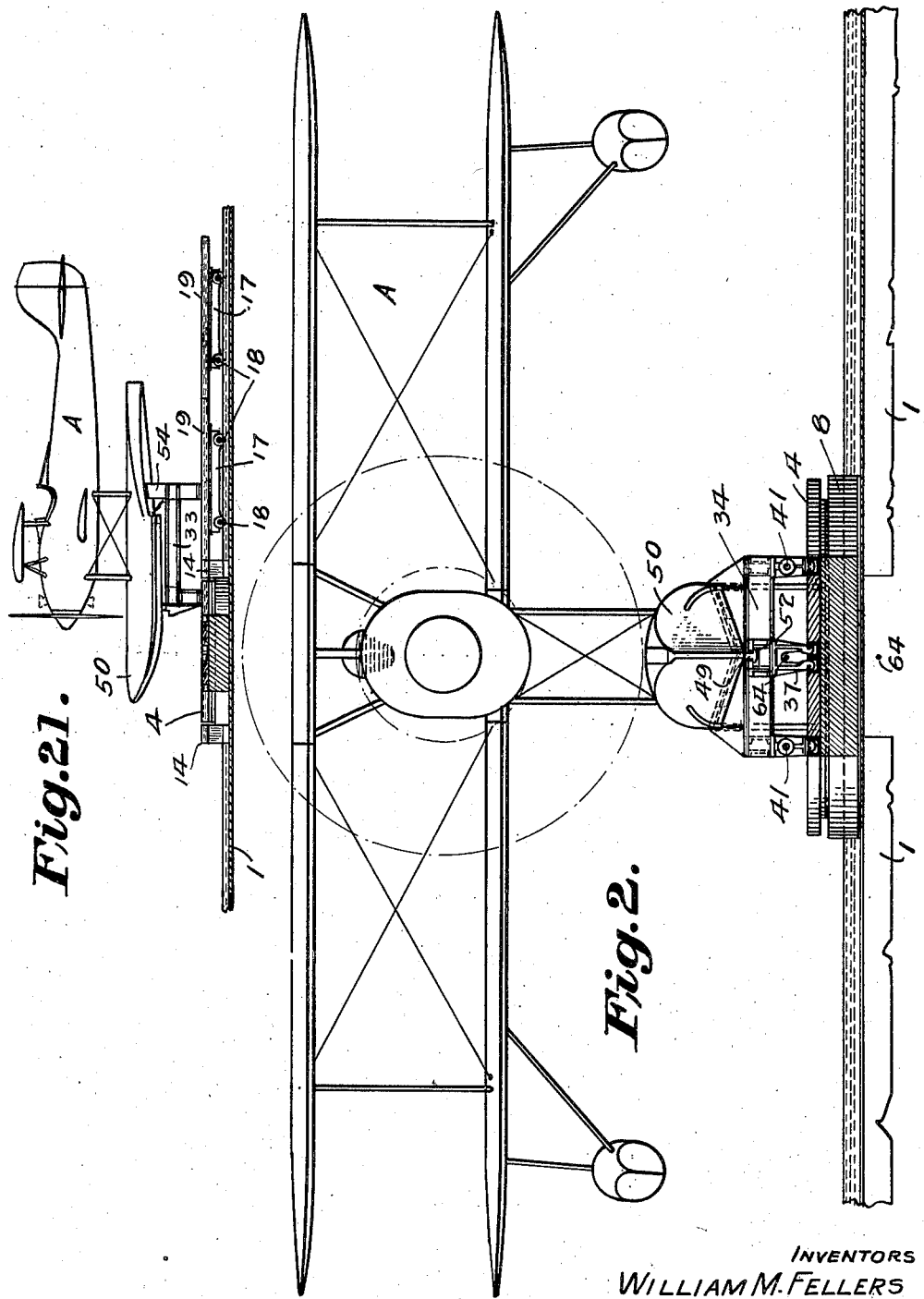

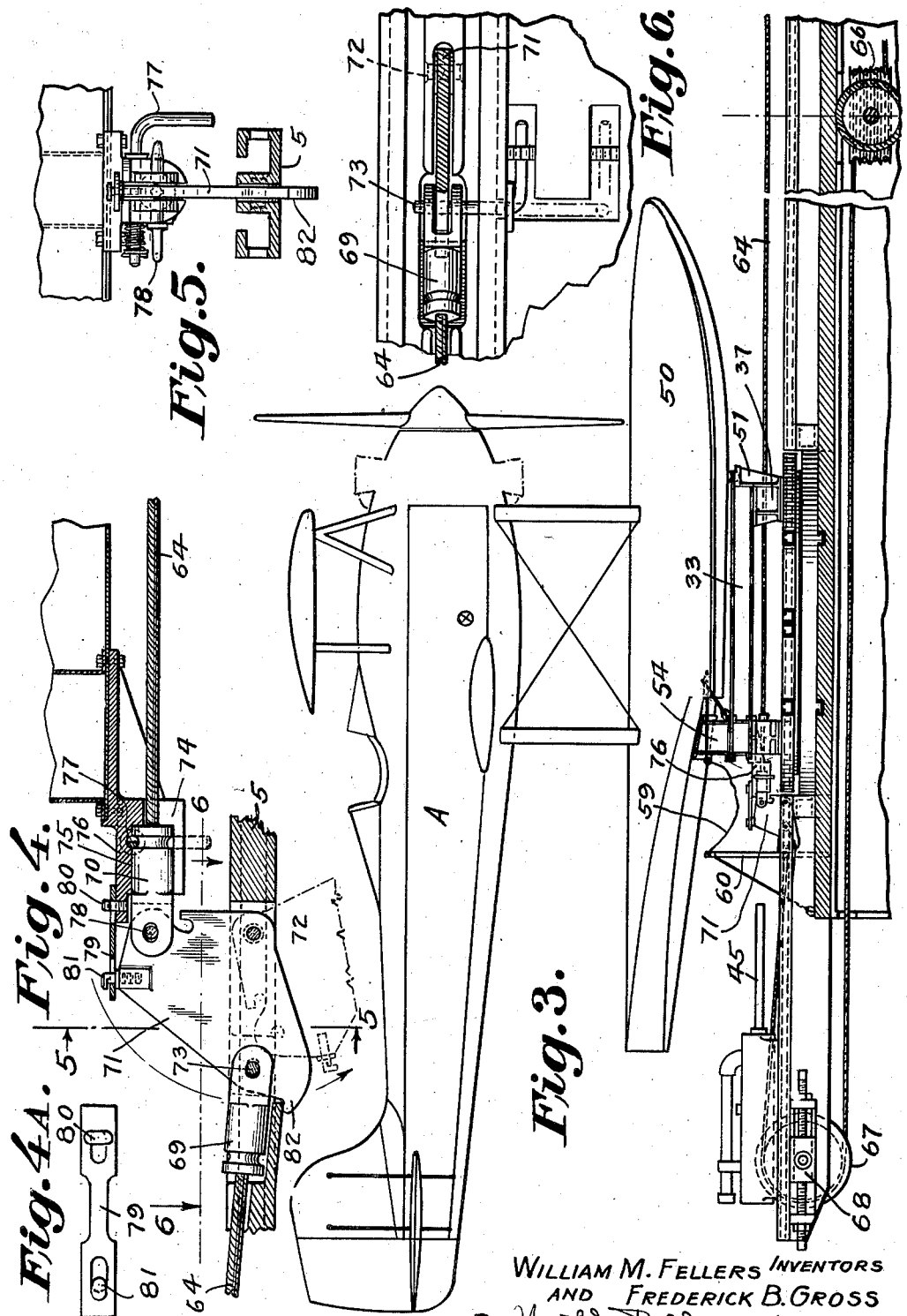

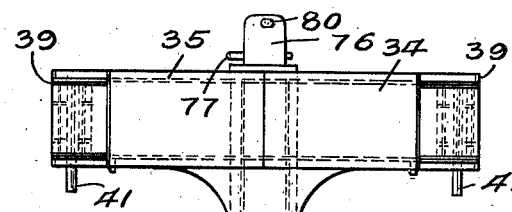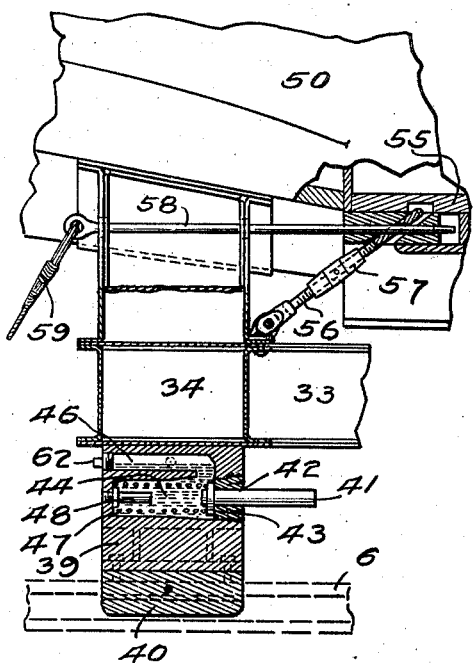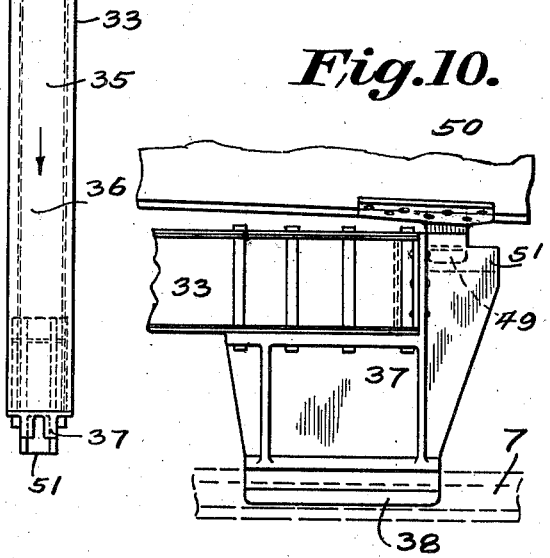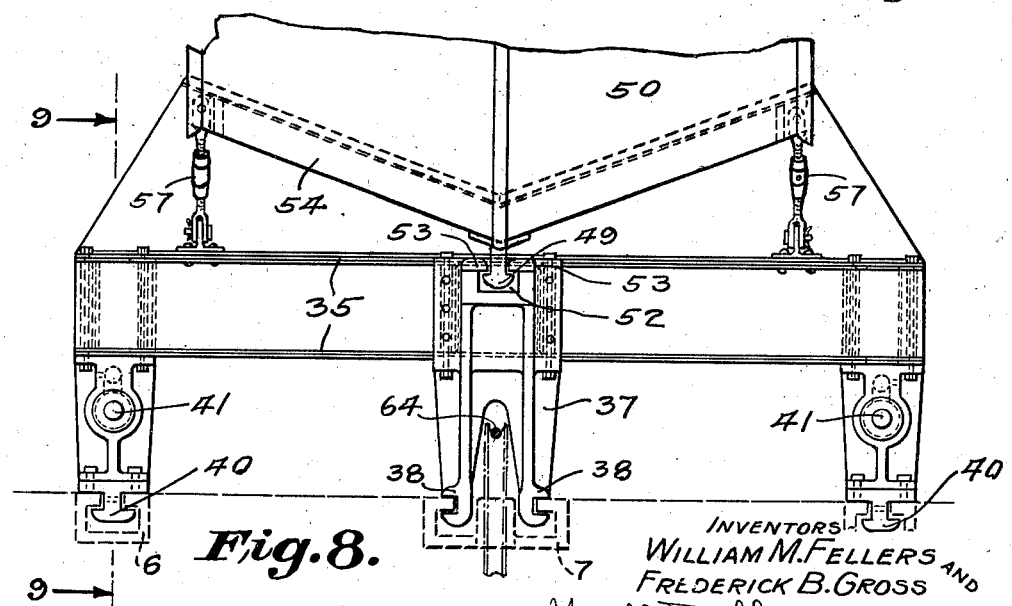

Aug. 9, 1938.   W. M. FELLERS ET AL   2,125,904
CATAPULT
Filed May 31, 1923    6 Sheets-Sheet 5
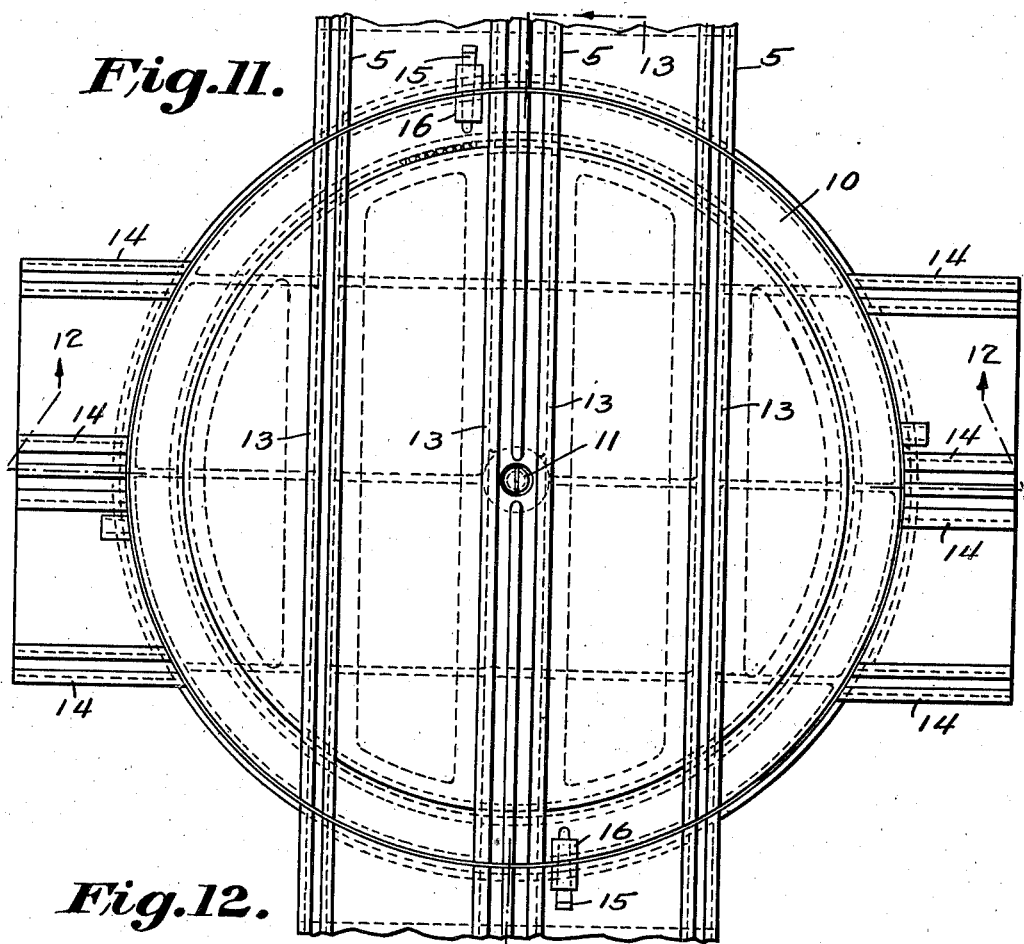
Fig.11.
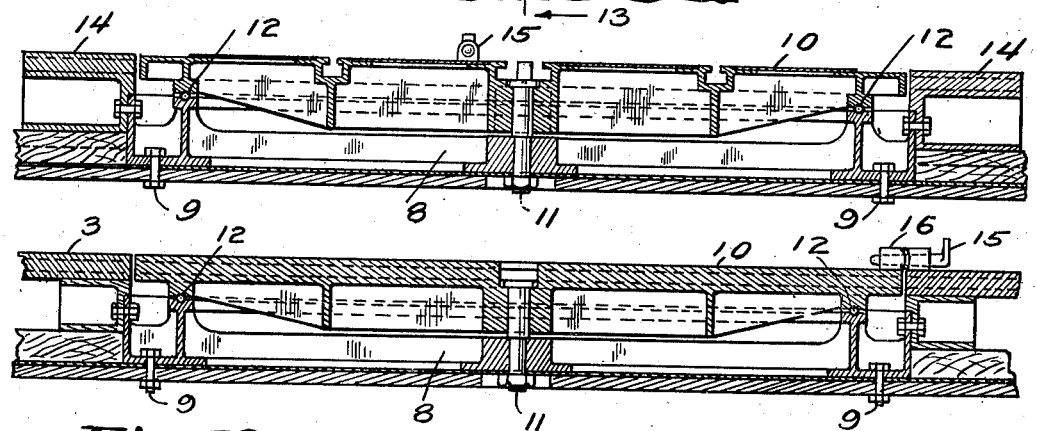
Fig.12.
Fig.13.
INVENTORS
WILLIAM M. FELLERS and
FREDERICK B. GROSS
BY
ATTORNEY

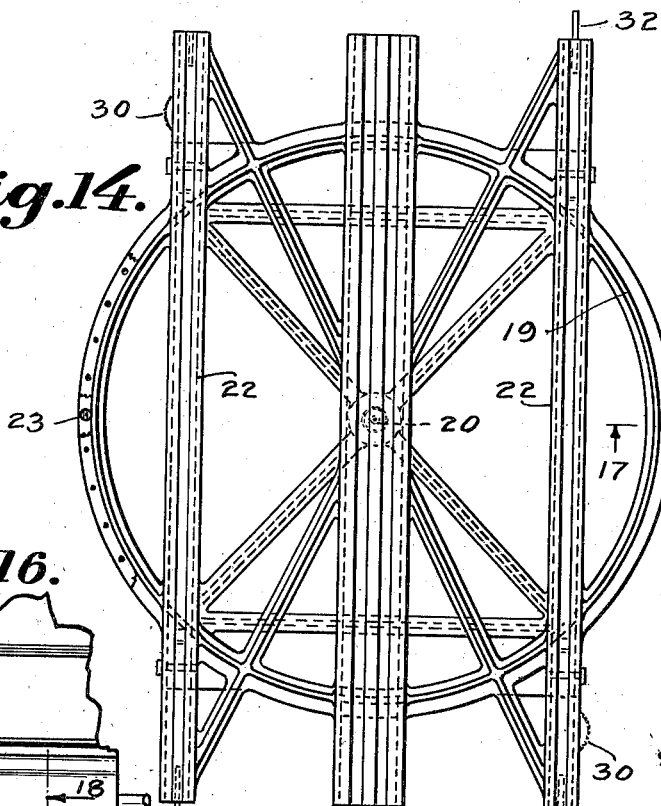
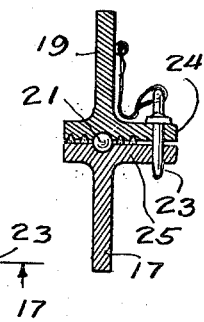
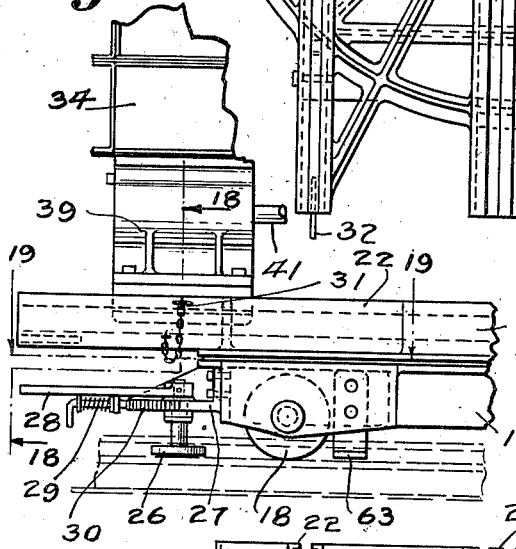
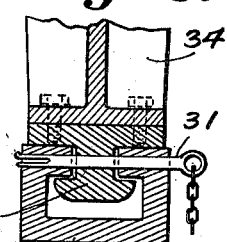
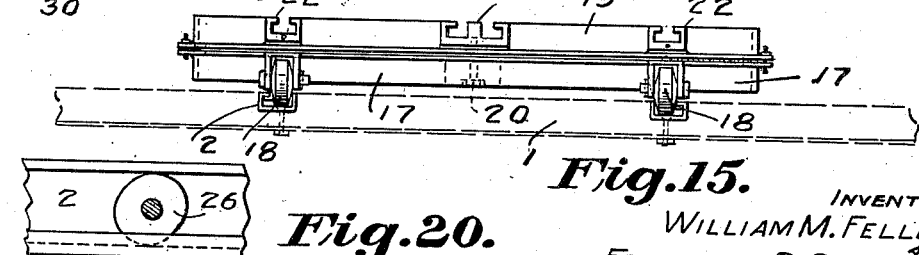

Patented Aug. 9, 1938

2,125,904

UNITED STATES PATENT OFFICE 2,125,904

CATAPULT

William M. Fellers, Washington, D. C., and Frederick B. Gross, Rosslyn, Va.

Application May 31, 1928, Serial No. 281,846

32 Claims. (Cl. 244—63)

(Granted under the act of March 3, 1883, as amended April 30, 1928; 370 O. G. 757)

Our invention relates to an improved method of and apparatus for launching aircraft.

It has heretofore been the practice to launch aircraft from a pathway that was movable about an axis to thus launch such craft in its intended direction of flight. Such practice required cumbersome equipment and excessive space. We have discovered that such equipment and waste of valuable space may economically be dispensed with and such craft launched in a direction regardless of its objective direction which it may assume in its flight. We have also discovered that by this method of launching, a number of aircraft may be stored in storage pathways in close proximity to the launching pathway and readily transferred thereto without lifting such craft in such transfer.

Heretofore, in launching aircraft the pressure and stress upon the holding catches or latches is such, especially just previous to their release, as to cause the metal forming such catches or latches to knit together and cause uncertainty, and substantial damage, due to failure to properly release. We have discovered that such holding catches or latches may be dispensed with and their attendant uncertainty and liabilities eliminated by our improved method of securing the craft substantially stationary and timely breaking or severing such securements in the launching.

Heretofore, in launching aircraft one common launching car has been employed in all launchings, which has required much lifting of such craft, mechanically and manually, onto such common car. We have discovered that this may be conveniently, economically and more expeditiously dispensed with by our improved method including the steps of associating each craft to be launched with a separate carrier in a pre-launching pathway, transferring such carried craft to be launched to a launching pathway, releasably securing said carrier at a point in said launching pathway, applying launching force to said carrier and releasing said carrier.

Heretofore, in launching aircraft they have been launched always in the same direction along a launching pathway, which, in launchings from restricted areas, substantially restricts such launchings as well as the adjacent storage of such craft to be launched. We have discovered that said restriction is conveniently, economically and more expeditiously overcome by our improved method including the steps of associating a launching pathway and a launching force, and applying said launching force at will in either direction along said pathway or a portion thereof; and that by said method a greater number of craft may be conveniently, economically and expeditiously stored in a given space by our improved method of associating with said launching pathway a plurality of storage pathways intermediate the ends of said launching pathway, and which storage pathways may extend in one or more directions from said launching pathway, and turning each craft and its carrier at, or in making, the junction of the particular storage pathway with said launching pathway to face the craft to be launched in the direction the same is to be launched. This method contemplates for convenience, economy, certainty, and safe launching, that each craft be launched from a carrier and that the launching velocity of said carrier be checked at or near the end of the launching pathway in either direction in which the craft may be launched. This method further contemplates that each pathway may be at a different, preferably lower, level from the launching pathway, in which case each craft to be launched is provided with a transfer carrier whose upper surface is in substantially the same plane as said launching pathway with a launching carrier thereon upon which the craft to be launched rests and from this plane said craft and its launching carrier may be readily transferred to the launching pathway.

To demonstrate the practical utility of our said improved method, a related, improved and novel apparatus embodying our invention, and which may be used most advantageously, economically and safely in practicing said improved method as a unitary and related invention, is provided to also serve as a practical example, to those skilled in this art, of the facility with which, after becoming familiar with our invention, and the problems solved thereby, the many forms and kinds of existing apparatus, with or without substantial modification, may be employed in the efficient economical and expeditious practice of our said method.

Our invention relates broadly to catapults operated by prime movers, and more particularly to catapults for launching airplanes from barges, ships, limited land areas, and restricted spaces, such as tops of buildings and the like.

An object of our invention in its apparatus aspect is to provide a means for launching airplanes in either of two directions from a double-ended stationary catapult structure.

Another object of our invention in its apparatus aspect is to provide the launching track upon, or as part of, the deck of a vessel or other foundation, as well as to conveniently associate, or combine, the same with storage or other track or tracks, as well as to provide a turntable, or other turning means, at preferably each juncture of said launching and storage tracks.

Another object of the invention in its apparatus aspect resides in a novel means for storing, transporting, and handling of an airplane anchored to a launching car, and the transfer of the airplane and its launching car from storage to the catapult beam without hoisting.

Still another object of the invention in its apparatus aspect is to provide a means for anchoring an airplane, launching car, and handling truck to a storage track in such a way that the airplane is stabilized against danger of tipping over due to cross wind currents, or from creeping forward due to propeller thrust when testing the engine of the airplane while on the storage tracks.

Another object of the invention in its apparatus aspect is to utilize the same means that secured the airplane to the launching car while in storage as a holdback and hold-down after the assemblage has been transferred to the catapult beam track in battery position for launching.

A further object of the invention in its apparatus aspect resides in a novel means for releasing the airplane from the launching car when the catapult is fired.

With the above and other objects in view the invention consists in the method and its various novel steps, and in the apparatus with its combination, construction and arrangement of parts as will be hereinafter fully described.

These and other objects of our invention will be more apparent, both as to the method and its various steps advantageously exemplified in the apparatus as well as the apparatus in itself, from the following detailed description, and the accompanying drawings, illustrating one embodiment of our invention in an improved apparatus, typical of the many different forms and characters of apparatus, each of which may be employed in the practice of our improved method, although we have achieved greater advantages and safety by the employment of the improved apparatus substantially as shown and described.

Reference is to be had to the accompanying drawings forming part of this specification, in which like reference characters indicate corresponding parts throughout the several views, and in which—

Figure 22:
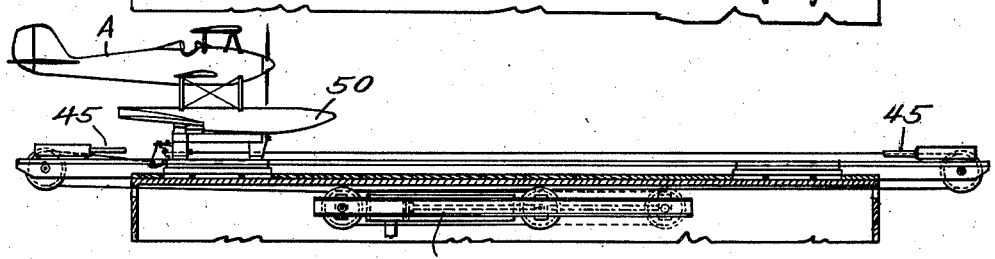

Figure 1 is a diagrammatic plan view of a catapult involving the features of our invention, Figure 2 is an enlarged vertical transverse sectional view through a catapult, showing a front view of an airplane mounted on a launching car in battery position, Figure 3 is a side view, partly in section, of an airplane mounted on a launching car in battery position, Figure 4 is a central longitudinal section through a release mechanism, launching cable connections, and safety hold-back pin, Figure 4a is a detail plan view of a release bar hold-back, Figure 5 is a sectional view on the line 5—5 of Figure 4, Figure 6 is a horizontal section on the line 6—6 of Figure 4, showing a method of securing the fixed end of the launching cable to the catapult track structure, Figure 7 is a plan view of the launching car comprising part of our invention, Figure 8 is a front view of the launching car mounted on the catapult tracks, Figure 9 is a sectional view on the line 9—9 of Figure 8, Figure 10 is a side view, partly broken away, showing the forward portion of the launching car mounted on the track, Figure 11 is a plan view of the catapult turntable and associated tracks, Figure 12 is a sectional view on the line 12—12 of Fig. 11, Figure 13 is a similar view on the line 13—13 of Fig. 11, Figure 14 is a plan view of the handling truck, Figure 15 is an end view of the handling truck, Figure 16 is a detail view of a portion of the handling truck showing a means for securing the truck to the track, Figure 17 is a sectional view on the line 17—17 of Figure 14, Figure 18 is a sectional view on the line 18—18 of Figure 16, Figure 19 is a sectional view on the line 19—19 of Figure 16, Figure 20 is a side view of a means for applying braking pressure to the tracks to hold the truck thereon, Figure 21 is a view showing the manner of transfer of an airplane mounted upon a launching car, from the handling truck to the catapult turntable, and Figure 22 is a view showing a modification in the position of the prime mover or catapult engine.

In describing our invention in its apparatus aspect we will separate the several details into four sections, namely, the track system, the handling truck, the launching car, and the launching mechanism or cable.

*The track system.*—Referring more particularly to the drawings, 1 designates a foundation on which is mounted a double-ended stationary catapult structure, that includes a plurality of storage tracks 2, a catapult beam 3, and turntables 4 that connect the tracks 2 with a track 5 extending longitudinally of the catapult beam. While we have shown the storage tracks extending only at right angles to the beam, it will be understood that they may extend from as many different angles as may be desired, and also that they may be arranged in any desired manner on the foundation. The tracks consist of outer rails 6 and the inner rail 7, each of the rails of track 5 being slotted and having overhanging lips, as shown in Fig. 8. The turntables each consist of a stationary base member 8 secured to the foundation by fastening elements 9, and an upper member 10 rotatable with respect to the base 8 around a pivot bolt 11 that is screwed into the foundation, as may be seen in Figs. 11, 12, and 13. Ball bearings 12, resting between the base and upper member, permit easy movement of the latter. Tracks 13, on the rotatable member and of a construction similar to the track 5, are brought into alignment with the track 5 or with stub-tracks 14, extending from the turntable at right angles to the beam track. The stub-tracks are in alignment with the storage tracks but on a higher level in order that the launching car with an airplane mounted thereon may be transferred from a handling truck to the catapult turntable, as will be described hereinafter. When the turntable track is brought into alignment with the stub-tracks, it is held in that position by tapered pins 15, carried by the stub tracks, or catapult beam, or both, that engage with catches 16 on the upper member 10.

*Handling truck.*—In order to facilitate handling of an airplane both in storage and when placing it in battery position on the catapult beam, we provide a handling truck that has a track on which a launching car may be placed. A turntable supported by the truck permits an airplane to be trained to any desired horizontal direction while in storage allowing a more compact grouping together since more latitude of movement is available than is the case without a turntable.

With reference to Figs. 14 to 19, the handling truck on which the launching car and airplane are mounted for storage and movement to the catapult beam, and which operates on the storage tracks 2, is provided with a base member 17 to which the wheels 18 are attached. An upper member 19, pivotally connected to the base by a bolt 20 and supported thereon by ball bearings 21, carries a track 22 of a construction similar to that of the launching tracks above described and which are of approximately the same height above the foundation 1 as the stub-tracks 14 on the catapult beam. This upper member forms a turntable by which the launching car may be turned to any desired position. After being positioned, the turntable is held against further rotation by passing a pin 23 through aligned openings in the flanges 24 and 25 of the upper and base members, respectively. Also the handling truck may be held in any desired position along the track by means of a locking device that engages with one of the rails of the track 2. This lock comprises a cam 26 supported by a bracket 27 secured to the base of the truck, and is operated by a lever 28. A spring controlled catch 29 engaging with a rack 30 maintains the cam in any degree of contact with the rail. To prevent tipping of the handling truck on the track there is provided a shoe 63 that engages under the overhanging lip of the rail. While the launching car is mounted on a truck, a pin 31 is passed through openings in the rails of track 22 and a T-shaped shoe (to be later described) of the car, preventing accidental slipping of the car. It will be understood, however, that when the car is placed in battery position on the catapult beam, the pin is withdrawn and the car held by other means to be later described. Very often it is desirable to place a number of trucks in a line while in storage, and it might be that the required airplane is mounted on the furthermost truck, in which case it is necessary to run the airplane over the full line of trucks. To insure proper alignment of the turntables in such an event, each of them is provided with a projecting pin 32 that fits into a corresponding recess in the adjoining turntable. An arrangement of such an alignment of trucks is shown in Fig. 21.

*Launching car.*—Referring to Figs. 7 to 10, the launching car comprises a longitudinal or body portion 33 and a rear cross member 34, each of which is composed of angle bars 35 and plates 36. When mounted on the catapult beam track 3, the forward end of the body portion is supported by a fitting 37 (Fig. 8) having lipped flanges 38 that are seated in the slot of the inner rail 7 of the track. The rear cross member is supported at its outer ends by fittings 39 having inverted T-shaped shoes 40 for sliding engagement with the slots in the outer rails 6 of the track 3. The fittings 39 house hydraulic shock absorbers comprising pistons 41 passing through bores 42 in the walls of the fittings, and plungers 43 operable within fluid containing chambers 44. The pistons contact with hydraulic buffers 45 arranged at each end of the catapult beam (Fig. 22), the two coacting to absorb the shock of sudden stopping of the car when it has reached the limits of its travel at the beam end. When the pistons have been forced inwardly, the fluid displaced in chambers 44 finds its way into auxiliary chambers 46. As the resulting action is similar to that of well known hydraulic shock absorbers, it is thought that a detailed description of the same is here not required. Springs 47 hold the pistons in a normal outwardly extended position. As an additional safety means and as a means for preventing too great a compression being placed upon the spring, stop pins 48 are provided within the chambers against which the pistons will abut when they are forced inwardly to their full extent. The chambers 44 are filled through openings closed by stoppers 62.

In mounting the airplane on the launching car a T-shaped finger 49, secured to the forward end of the float 50 of the airplane A, is placed on the projecting part 51 of the fitting 37, after which the airplane is moved rearwardly causing the finger to engage in a slot 52 formed by the overhanging edges 53 of the upper portion of the fitting. As the finger is firmly seated therein, possibility of the forward portion of the airplane being jarred off the launching car is reduced to a minimum. When the finger is properly engaged in the slot, the rear of the float snugly fits into a V-shaped cradle 54 carried by the rear cross member 34 of the launching car. A hold-down and hold-back mechanism is provided to maintain the float in a secure position in the cradle. This mechanism comprises a fitting 55 having two passageways therethrough, one extending longitudinally thereof, and the other at an angle thereto. This fitting is situated near the intersection of the chine and the step of the float of the airplane. A retaining member 56 that may be varied in length by a coupling 57 is pivotally connected to the cross member forward of the cradle and extends into the tangential passageway. Forward movement of the float is prevented by this retaining member until a release pin 58, that passes through the longitudinal passageway and an eye in the retaining member, is withdrawn. The pin 58 is attached to a slack cable 59 that is made fast to a convenient stationary member of the catapult in any desired manner, one method being that illustrated in Fig. 3 wherein the cable is attached to a support 60. When the airplane is being launched the release pin is automatically withdrawn after the launching car has travelled a short distance along the track under power of a prime mover, designated generally by 61, thus disconnecting the fastening between the float and the cradle, allowing the airplane to slide off the car when the car is decelerated at the end of its run.

*Launching mechanism.*—The mechanism for imparting motion to the launching car consists of a prime mover 61 and a cable 64 that is passed around translating sheaves 65 connected to and operated by the prime mover (Fig. 1). The cable is then wound alternately over non-translating sheaves 66 from whence it is carried outwardly and around guide sheaves 67 on the extreme ends of the catapult and which are mounted in adjustable bearing boxes 68. The cable is then brought inwardly and is fastened as shown in detail in Fig. 4 and as will be now described. To the respective ends of the cable there are attached couplings 69 and 70 that are identical in construction. One of these couplings is attached to the launching car and the other to the catapult frame when a launching is to be made. For the purpose of illustration, when a launching is to be made to the right, the cable coupling 69 is anchored to a member 71 pivotally connected in the slot of the inner rail of track 5 by a pivot pin 72. One of said members 71 being so mounted near each end of the catapult structure, the one not in use occupying the position shown in dotted lines, while the used member 71 is, by the cables and member 79, held in the full line position, shown in Figure 4, and in which dotted position it clears the car and cables. A latch pin 73 (see Fig. 6) secures the coupling to the pivoted member. The other coupling, 70, is brought back to the left before tension is applied to the cable, and the cable is passed up between sides 74 of the fitting so that the coupling may be seated in a bore 75 of a fitting 76 located at the rear of and secured to the launching car, as shown in Figures 4 and 7, where it is held against accidental release by a spring held locking member 77. The coupling is then made fast to the member 71 by a safety release pin 78, that is withdrawn just prior to the launching. Care should be exercised, that, in the event the charge fails to start the car, the pin be immediately replaced to prevent accident that might otherwise result from delayed action of the prime mover. With the safety release pin removed the hold-back and final release of the launching car is dependent upon a release bar 79, preferably made of copper, although other suitable materials may be used. This bar is designed to break at a predetermined load applied to the cable. One end of the bar is slipped over a lug 80 that is situated at right angles to the fitting 76 of the launching car, and the other end is placed over a lug 81 carried by the catapult frame through the member 71. The pivoted member is prevented from being pulled forward about its pivot, as the car moves over the track, by a lip 82 that engages with the under side of the track 5.

It will be understood that when a launching is to be made from the other end of the catapult, the unused member 71 is swung about its pivot through the slot out of the way of travel of the launching car, as shown by dotted lines in Fig. 4.

*Operation.*—When it is desired to make a launching, an airplane already seated on a launching car is placed on one of the handling trucks stationed on the storage tracks, these tracks extending to a suitable elevator or hoisting device, not shown. The pin that holds the truck to the track is withdrawn, the cam brake released, and the truck rolled up to the stub-tracks of the catapult. One of the turntables of the catapult is aligned with the stub-tracks, and the one on the opposite end of the catapult is aligned with the launching tracks to permit the launching car to travel the full length of the catapult. Any number of empty handling trucks can be run up to the catapult and the launching car transferred to the turntable without backing off of any truck, as has been previously explained. When the handling truck has been brought into proximity with the catapult beam, it is retarded in its forward movement by the application of pressure on the track rail by the brake cam, and is then securely held in position by the replacement of the securing pin. The catapult turntable, after receiving the launching car, is rotated and locked into alignment with the beam track. One end of the launching cable is secured to the launching car and the other end to the catapult track. The safety hold-back and release bar is put into position between the car structure and the catapult track structure, the safety locking member is inserted to hold the cable to the catapult structure direct, and slack taken out of the cable by means of the prime mover. When all is in readiness for the launching, the safety locking member is removed from the cable end, placing the strain on the release bar, and the prime mover fired. When a predetermined load has been applied to the cable by the prime mover, the release bar is severed, freeing the launching car. As soon as the car has travelled a short distance along the beam, the hold-down and hold-back mechanism is freed from the airplane allowing it to continue its travel after the car has reached the end of its run and has been stopped by the buffer.

The breakage or severance of the release bar 79 under the intended stress provides a securement usable but once and obviates the employment of movable latches which in repeated use are subject to great wear and compression of the metal causing uncertainty in release and liability to injure craft and personnel.

As soon as one airplane has been launched, another may be placed in battery position on the catapult by following the above procedure, the launching car already at the end of its run being removed by means of the second turntable. No unnecessary time is lost in placing the second airplane in position for launching, as it may be done while the launching cable is being detached from the car that has completed its run.

When it is desired to make a launching in the opposite direction, the cable connections are led to the other end of the catapult track and the cable end that was previously connected to the car is attached to the catapult structure, as previously explained, and the end that was attached to the track structure is now attached to the launching car. The launching is conducted as in the previous direction.

It will be understood that the above description and accompanying drawings comprehend only the general and preferred embodiment of our invention and that various minor changes in details of construction, proportion and arrangement of parts may be made within the scope of the appended claims and without sacrificing any of the advantages of our invention.

The invention herein described may be manufactured and used by or for the Government of the United States of America for governmental purposes without the payment of any royalties thereon.

What we claim is—

1. In a device for launching an airplane, a catapult structure adapted to be secured upon a relatively rigid base, a launching track, means for rigidly securing said track upon said structure, means for launching an airplane in either one of opposite directions along said structure, and means at opposite ends of said structure for securing a plane in launching position at either end of the structure and adapted to not obstruct the launching of the plane from the end of the structure at which the plane is not secured.

2. In a device for launching an airplane, in combination, a catapult adapted to be mounted upon a relatively rigid base, a track thereon, means for rigidly securing said track relative to said catapult and base, a launching car movable along the track, an airplane carried by the launching car, a prime mover for moving the launching car, means whereby the force of said prime mover may propel said car in either one of opposite directions along said track, and means near the ends of said track for limiting the launching movement of the car.

3. In a device for launching an airplane in either direction along a catapult structure, in combination, a launching way, a launching car movable therealong, an airplane detachably carried by the car, a prime mover for causing the car to travel over the launching way, means on the catapult structure whereby the car may be turned when placing the car on the launching way, and means whereby the force of said prime mover may propel said car in either one of opposite directions along said track.

4. In a device for launching an airplane in either direction along a catapult structure, in combination, a launching way, a launching car movable thereover, an airplane carried by the launching car, a prime mover for causing the car to travel over the launching way, tracks extending at an angle from the launching way, storage trucks operable on said tracks, said trucks supporting the launching car in storage, means for stabilizing the trucks upon the tracks, and turntables adjacent the ends of the launching way to transfer the launching car to the launching way.

5. In a device for launching an airplane in either direction along a catapult structure, in combination, a launching way, slotted rails thereon, turntables adjacent to either end of the launching way, rails corresponding to those of the launching way carried thereby, a launching car operable over the rails, means on the launching car engaging with the rails to hold the car thereon, means carried by the car for supporting an airplane, and means at the ends of the launching way for abruptly stopping the car and freeing the airplane therefrom.

6. In a device for launching an airplane, in combination, a launching way, a track thereon, a launching car operable over the track, said car being provided with slots in its forward end, opposed bearing surfaces adjacent said slot, and means secured to the airplane and adapted to occupy said slot and engage said surfaces in securing the airplane to the car.

7. In a device for launching an airplane, in combination, a launching way, a track thereon, a launching car operable over the track, means on the car engaging with the track, a locking means carried by the car and engaging with the plane to secure the plane against forward movement, the forward end of said car having a recess therein with a slot extending into said recess, and a member secured to the plane and adapted to occupy said slot, and an enlarged portion on said member adapted to occupy said recess and engage opposite walls thereof.

8. In a device for launching an airplane in either direction along a catapult structure, in combination, a launching way, tracks thereon, a launching car supporting an airplane operable over the tracks a fitting secured to the car, a member pivoted to the tracks and adapted to swing clear thereof, a prime mover, a launching cable connecting the prime mover and pivoted member and seated in the fitting, a quick detachable connection between the cable, fitting and pivoted member, and a release bar connecting the fitting and the pivoted member, said bar being breakable upon the application of a predetermined force freeing the car.

9. In a device for launching an airplane in either direction along a catapult structure, in combination, a launching way, tracks thereon, a launching car supporting an airplane operable on the tracks, a member pivoted to and near each end of the tracks and adapted to swing clear thereof, a fitting on the car, a prime mover, a launching cable connecting the prime mover and pivoted member and seated in the fitting, a bore extending into the fitting for the reception of a cable coupling, means communicating with the bore permitting passage of the cable thereinto, means for removably attaching said coupling to the pivoted member, means for attaching a second cable coupling to the pivoted member, and a sever bar connecting the fitting and pivoted member.

10. In a device for launching an airplane in either direction along a catapult structure, in combination, a launching way, tracks thereon, a car operable over the tracks, tracks extending at an angle to the launching way tracks, a truck operable over said second tracks and of a height equal to the distance between the first and second tracks, a rotary member on the truck for the support of the car previous to its transfer to the launching way, means for securing the car to the rotary member, and means for securing the truck on a desired position on the said second tracks.

11. Aircraft launching means including an instrumentality adapted to anchor the craft and whose strength is such as to withstand normal anchorage stresses and adapted to be fractured by and substantially simultaneously with the commencement of the launching movement, whereby the aircraft may be rigidly maintained in its launching position until said fracture.

12. Aircraft launching means including an element whose strength is sufficient to withstand launching preliminaries and which is fractured by the launching force, and means for securing said element to said craft and to a relatively stationary means, whereby the aircraft may be rigidly maintained in its launching position until said fracture.

13. As an article of manufacture for aircraft launching means, a bar provided with securement elements at opposite ends and whose intermediate portion is adapted to be of a strength sufficient to withstand launching preliminaries and fractured substantially coincident with the commencement of the launching movement, whereby the aircraft may be rigidly maintained in its launching position until said fracture.

14. Aircraft launching means including a launching track adapted to support an aircraft thereon, launching power means, and means for at will connecting said means to said craft to launch the same in either of opposite directions along said track.

15. Aircraft launching means including a launching track, means for mounting an aircraft thereon facing in either of opposite directions and movable coincident with the extent of said track, launching power means for launching said craft from along said track in either of said directions in which said craft may be faced.

16. With the structure of claim 15 means near each of the opposite ends of said track for decelerating said power means.

17. Aircraft launching means including a launching track, and one or more pre-launching pathways leading at an angle to and adapted to be connected with said track.

18. Aircraft launching means including a launching track and one or more pre-launching pathways leading at an angle to and adapted to be connected with said track and in a different plane from said track.

19. Aircraft launching means including a launching track and one or more pre-launching pathways leading at an angle to and adapted to be connected with said track and in a lower plane from said track.

20. With the structure of claim 18 a transfer car adapted to support an aircraft in a pre-launching pathway, a launching car on said transfer car and adapted to support said craft, and means whereby said launching car and its burden may be transferred to said launching track.

21. Aircraft launching means including a launching track, a plurality of aircraft to be launched, and a separate launching car for each craft to be launched, each car being provided with means adapted to removably connect the craft and a launching force thereto.

22. With the structure of claim 21, one or more pre-launching pathways, means for securing said craft to their respective pathways, means for transferring each said secured craft to said track.

23. With the structure of claim 21, means for transferring each craft with said means to the launching track, means for removably securing each craft to its transfer means, launching power means, and means for connecting said power means to each of said transfer means at different times.

24. With the structure of claim 21, means for transferring each craft with said means to the launching track, means for removably securing each craft to its transfer means, launching power means, means for connecting said power means to each of said transfer means at different times, and means for disconnecting said craft and car during their movement by said power means.

25. With the structure of claim 21, means for transferring each craft with said means to the launching track, means for securing each craft to its transfer means, launching power means, means for connecting said power means to each of said transfer means at different times, means for disconnecting said craft and its transfer means during their movement by said power means, and means for decelerating the velocity of said transfer means moved by said power near the end of said track.

26. Aircraft launching means including a launching track, one or more pre-launching pathways, a separate launching car for each craft to be launched, means whereby each craft to be launched may be secured to its respective launching car, means whereby said craft and launching car may be transferred from a pre-launching pathway to said track, means whereby said secured craft may be secured at a point in said track, launching power means adapted to propel said launching car along said track upon the release of said craft and its car, means whereby said release may be effected, and means for releasing said craft from its launching car and decelerating the velocity of said launching car.

27. With the structure of claim 26, means for removably securing said launching cars to their respective transfer cars, which launching cars are superimposed upon their respective transfer cars, and said pre-launching pathway or pathways being in a lower plane than said launching track to the extent substantially corresponding to the heighth of said transfer cars.

28. Aircraft launching means including a transfer carrier adapted to support an aircraft and having a defined pathway upon the upper surface thereof.

29. With the structure of claim 28, a launching track substantially interchangeable with said pathway, and means whereby a craft to be launched may be transferred from said pathway to said track.

30. Airplane launching means including a launching track over which craft may be propelled in launching, means forming a section of said track whereby said craft may be turned to face in either direction of said track, and means for securing said means in line with said track.

31. Aircraft launching means including a launching track over which craft may be propelled in launching, and a plurality of means each forming a separate section of said track whereby said craft may be turned to face in either direction of said track.

32. With the structure of claim 30, means for securing said turning means in alignment with said track.

WILLIAM M. FELLERS.
FREDERICK B. GROSS.